United States Patent [19]
Schmidt

[11] 3,799,282
[45] Mar. 26, 1974

[54] SPRING BALANCE
[75] Inventor: Karl Otto Schmidt, Idar-Oberstein, Germany
[73] Assignee: Gebruder Schmidt Metallwarenfabrik O.H.G., Idar-Oberstein, Germany
[22] Filed: Sept. 4, 1973
[21] Appl. No.: 393,755

[30] Foreign Application Priority Data
Apr. 27, 1973 Germany............................ 2321288

[52] U.S. Cl. ............................................... 177/230
[51] Int. Cl............................................ G01g 23/26
[58] Field of Search ............ 177/170, 225, 229, 230

[56] References Cited
UNITED STATES PATENTS
2,649,294  8/1953  Walter................................ 177/229
2,821,376  11/1958  Aston............................ 177/229 X FOREIGN PATENTS OR APPLICATIONS
439,382  12/1935  Great Britain...................... 177/225

Primary Examiner—George H. Miller, Jr.

[57] ABSTRACT

A spring balance with a horizontal scale, which comprises a housing, and a weighing pan which is mounted to perform a substantially vertical movement upon placing a weight on the weighing pan, and includes a support and a drive pin disposed at its end. A pointer is movable in a horizontal direction and indicates the weight on a scale. A device for converting the vertical movement of the weighing pan into a horizontal movement of the pointer. The converting device includes a deflection wheel which has a radial slot receiving the pin and is mounted in the housing. A spring is engaged to and holds the weighing pan in its starting position and serves as standard of comparison.

5 Claims, 4 Drawing Figures

PATENTED MAR 26 1974  3,799,282

SPRING BALANCE

The present invention relates to the improvement of spring balances, such as are customary for the weighing of letters, packages and for many other purposes. In this type of balance, the tension of a calibrated spring is compared with the weight of the object to be weighed and the result made visible on a scale.

Many different embodiments are known, in most of which the scales for the reading of the weight are of barrel or dial shape. In this connection either the scale is movable and the pointer stationary, or the pointer is movable and the scale is stationary. Balances are desirable, which have a large, easily viewed scale on which, for instance for the weighing of letters, the maximum weights for the individual types of mailings are entered, while in the case of diet balances, information concerning caloric content of different foods are entered. In order to satisfy the desire for a large, easily viewed scale and arrive at a simple mechanical construction, in the ordinary spring balances the pointer moves vertically, which necessarily results in a vertical scale. In order to satisfy the desire for a long scale which can thus be read accurately, a large structural height of the balance results and thus poor stability upon standing, together with a less attractive appearance.

It is one object of the present invention to provide a spring balance, wherein when a weight is placed on the pan of the balance, a vertical movement takes place, which is transmitted in simple fashion to the indicating device, for instance via a system of levers or a single rack. A calibrated spring serves for the weight comparison.

With these and other objects in view, which will become apparent in the following detailed description, the present invention, which is shown by example only, will be clearly understood in connection with the accompanying drawings, in which.

Figure 1:
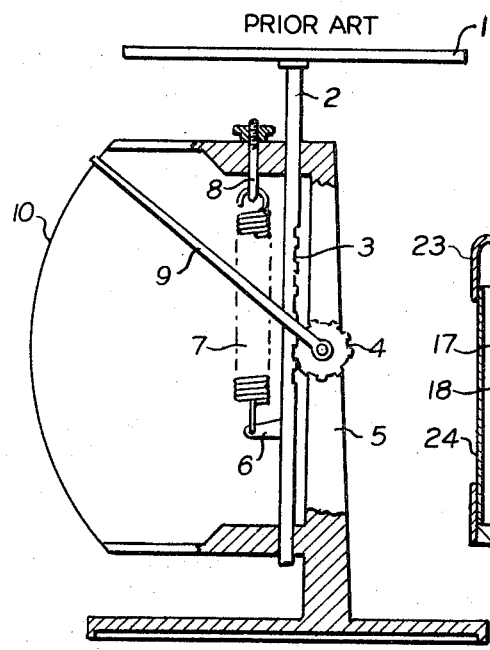
FIG. 1 is an elevation of a balance shown partly in section; and disclosing one embodiment of the prior art.

Referring now to the drawings, the weighing pan 1 bears on its bottom a rod 2 on which a toothing 3 is arranged. The teeth engage into a gear 4, which is supported in a rear wall 5 of a housing 5'. On the rod 2 there is a lug 6 in which one end of a spring 7 is fastened. The upper end of the spring 7 is attached to an adjustment screw 8 which serves to adjust the zero point. A pointer 9 is rigidly connected with the gear 4 and indicates the weight on a scale 10.

Another disadvantage of the balance described is the linear nature of its scale. If the scope of weighing has a size, which complies with practical needs, the front range, for instance the weight of single mailings in the case of postal balances, is scarcely readable. The accuracy of spring balances depends essentially on two criteria, namely on the precision of the spring, which must be manufactured with narrow tolerance in accordance with a predetermined characteristic and also on the sum of all bearing-point frictions.

For the calibration of the scale, it is customary to provide a device for adjusting the zero point, by means of which, however, it is not possible to compensate for deviations of the spring from the predetermined characteristic as a result of manufacturing tolerances, fatigue or ageing.

In order to obtain small bearing frictions, a design must be selected, which has the fewest possible points of support, which are as free as possible of friction.

It is therefore one object of the present invention, to provide such a spring balance, which avoids all the disadvantages indicated above.

Figure 2:
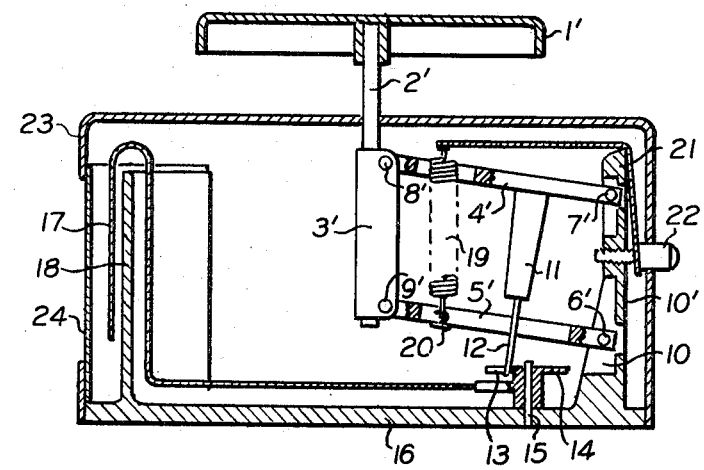
FIG. 2 is a vertical section of a spring balance designed in accordance with the present invention.

Referring now again to the drawings, and in particular to FIG. 2, a cross section through a balance in accordance with the present invention is disclosed. A weight placed on a weighing pan 1' moves the pan downwardly. A support 2', which is arranged on the bottom of the weighing pan 1' at its center of gravity is connected via a pan holder 3' with a system of levers consisting of levers 4' and 5' and the bearings 6', 7', 8' and 9', and forms a variable parallelogram. The lever system is connected to a rear wall 10 of an inner housing 10' at the bearing points 6' and 7'. The bearing points 8' and 9' serve for the parallel guiding of the weighing pan 1'.

A support 11 is arranged on the lever 4'. At the lower end of a support 11 there is located a pin 12 which engages into a slot 13 of a deflection wheel 14. The deflection wheel 14 is mounted by an axle 15 on a floor 16 of the inner housing 10'. A pointer 17 which indicates the weight on a scale 18 is fastened to the deflection wheel 14. A spring 19 serves as standard of comparison and at the same time holds the weighing pan 1' in its starting position. The lower end of the spring 19 is connected with the adjustable bridge 20 of the lever 5'. The upper end of the spring 19 is attached to a bent spring bridge 21 in the manner of a cutting grapnel, which is mounted on the rear wall 10 of the inner housing 10'. An adjustment screw 22 serves for the adjustment of the zero point. An outer housing 23 having a scale window 24 covers the system in dust-tight fashion.

Figure 3:
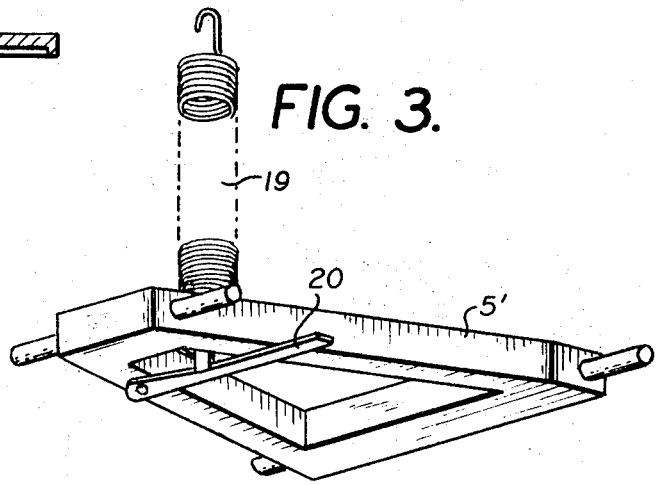
FIG. 3 is a schematic, fragmentary and perspective view of the spring balance depicting the operation of the adjustable spring.

FIG. 3 demonstrates the operation of the adjustable bridge 20. By its unilateral support on one arm of the lever 5', there is formed an adjustment lever, the purpose of which is to change the point of engagement of the spring 19 on the lever 5' by displacing the lower end of the spring 19. In this way, dispersions in the spring characteristic resulting from manufacturing tolerances and spring fatigues can be compensated for.

Figure 4:
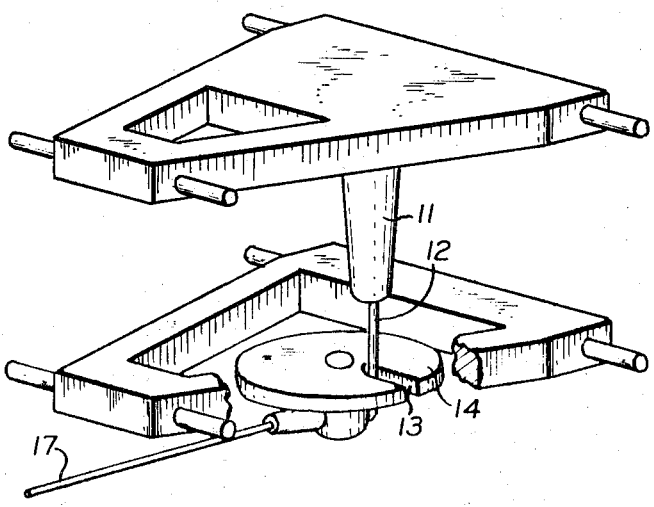
FIG. 4 is a schematic, fragmentary and perspective view of the spring balance depicting the function of the deflection wheel.

FIG. 4 discloses the function of the deflection wheel 14. When a weight is placed on the weighing pan 1', the support 11 is moved not only vertically downwardly, but also horizontally rearwardly. The pin 12 engages into the slot 13 of the deflection wheel 14 and by its horizontal movement causes a rotation of the deflection wheel 14. In this way the pointer 17 arranged on the deflection wheel 14 describes part of a circular arc. If the weight which has been applied is small, then the pin 12 is near the center point of the deflection wheel 14. Thus the transmission ratio to the pointer 17 is large. As the load becomes greater, the pin 12 moves further outwardly and the transmission ratio becomes continuously smaller. In this way there is produced a practically logarithmic course of the scale indication and thus small weights can be read accurately in the front range of the scale.

While I have disclosed one embodiment of the present invention, it is to be understood, that this embodiment is given by example only and not in a limiting sense.

I claim:
1. A spring balance with horizontal scale, comprising a housing,
a weighing pan mounted to perform a substantially vertical movement upon placing a weight on said weighing pan, and including a support and a drive pin disposed at its end,
a pointer movable in horizontal direction and indicating the weight on a scale,
means for converting said vertical movement of said weighing pan into a horizontal movement of said pointer,
said converting means including a deflection wheel having a radial slot receiving said pin and mounted in said housing, and
a spring engaged to and holding said weighing pan in its starting position and serving as standard of comparison.

2. The spring balance, as set forth in claim 1, wherein said pin drives said deflection wheel by engagement of said pin with said slot.

3. The spring balance, as set forth in claim 2, which includes a lever system carrying said support and causing said drive pin to perform a vertical movement in addition to a horizontal movement.

4. The spring balance, as set forth in claim 3, wherein said spring includes means for variably engaging said lever system, in order to compensate for the spring characteristic.

5. The spring balance, as set forth in claim 4, wherein said means for variably engaging said lever system comprises an adjustable bridge mounted on one side of said lever system.

* * * * *